US006560995B2

(12) United States Patent
Oga et al.

(10) Patent No.: US 6,560,995 B2
(45) Date of Patent: May 13, 2003

(54) METHOD FOR MANUFACTURING A FLUORESCENT LAMP

(75) Inventors: Toshiyoshi Oga, Shiga (JP); Masaru Saitoh, Kyoto (JP); Kozo Shirai, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 364 days.

(21) Appl. No.: 09/731,122

(22) Filed: Dec. 6, 2000

(65) Prior Publication Data

US 2001/0007197 A1 Jul. 12, 2001

(30) Foreign Application Priority Data

Dec. 22, 1999 (JP) ............................................ 11-364671

(51) Int. Cl.⁷ .............................................. C03B 23/13
(52) U.S. Cl. ............................. 65/105; 65/109; 65/110; 65/113
(58) Field of Search .......................... 65/105, 108, 109, 65/110, 113

(56) References Cited

U.S. PATENT DOCUMENTS

| 3,263,852 | A | * | 8/1966 | Fridrich | 220/2.1 R |
| 3,679,385 | A | * | 7/1972 | Senft | 65/60.51 |
| 3,905,795 | A | * | 9/1975 | Finch et al. | 65/279 |
| 3,939,538 | A | * | 2/1976 | Hellman et al. | 445/1 |
| 4,842,635 | A | | 6/1989 | Spaapen et al. | 65/108 |
| 5,037,342 | A | * | 8/1991 | Barthelmes et al. | 445/22 |
| 5,092,804 | A | * | 3/1992 | Desmarais et al. | 445/22 |
| 5,108,331 | A | * | 4/1992 | Shimada et al. | 445/3 |

FOREIGN PATENT DOCUMENTS

| JP | 4-58137 | 9/1992 |
| JP | 11-40057 | 2/1999 |

* cited by examiner

Primary Examiner—Sean Vincent
(74) Attorney, Agent, or Firm—Merchant & Gould P.C.

(57) ABSTRACT

A method for manufacturing a glass tube used for a fluorescent lamp having an arc tube constructed by joining a plurality of glass tubes is provided. According to this method, a straight glass tube held at both ends is rotated, and a predetermined cutting portion of the glass tube is softened by heating, and then the glass tube is moved in the heated state in the direction toward the predetermined cutting portion to form a glass accumulated portion at the area of the predetermined cutting portion. Next, the glass tube is drawn away in the direction receding from the predetermined cutting portion, and the predetermined cutting portion of the glass tube is cut into two glass tubes having self-closing end walls. In this way, the end walls of the self-closed glass tubes can be formed thicker and more uniform compared to those obtained by the conventional techniques, and the mechanical strength of the end walls also can be improved. As a result, the defective percentage of the lamps during the manufacturing process and on the market due to cracks, leakage, or damages in the end walls of the glass tubes can be reduced.

12 Claims, 9 Drawing Sheets

PRIOR ART

PRIOR ART

METHOD FOR MANUFACTURING A FLUORESCENT LAMP

BACKGROUND OF THE INVENTION

1. Field of the Invention

The present invention relates to a method for manufacturing a fluorescent lamp. In particular, the present invention relates to a method for cutting a glass tube used for a fluorescent lamp.

2. Description of the Related Art

In the last few years, the consciousness for saving energy has increased, and as an alternative energy-saving light source that takes the place of low efficiency bulbs, the use of compact fluorescent lamps has been promoted.

Figure 7A:
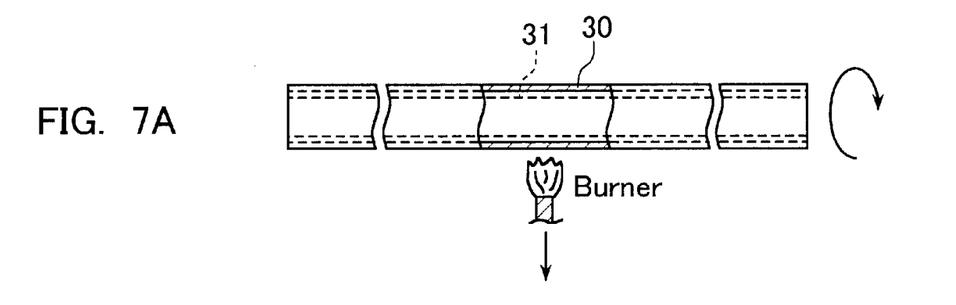
FIG. 7A to FIG. 7C are process drawings showing a conventional method for manufacturing a fluorescent lamp.
Figure 7B:
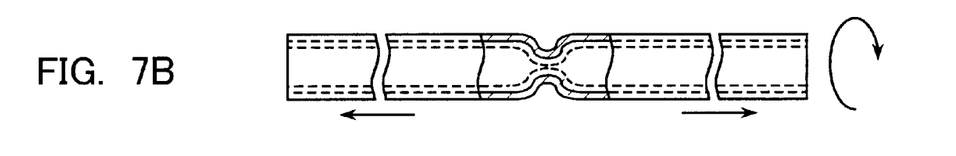
Figure 7C:
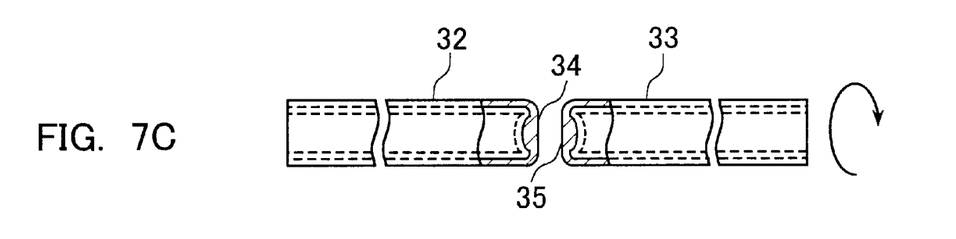

For example, JP4(1992)-58137B2A proposes a typical structure of an arc tube and a method for manufacturing the same. Within this manufacturing method, the steps of processing a glass tube are shown in FIG. 7A to FIG. 7C as follows:

(A) A glass tube 30 coated with a fluorescent substance 31 on the inner surface is rotated around a tube axis, and while the glass tube is rotated, a glass wall at the area near the center of the glass tube 30 is heated by a burner up to a temperature that is slightly higher than the softening temperature of the glass tube.

(B) End portions of the glass tube that are not softened are drawn away from each other, and the cutting portion cut is thinned by the heat of the burner.

(C) The glass tube 30 is cut into a pair of glass tubes 32 and 33. At this stage, the pair of glass tubes 32, 33 have self-closing end walls 34 and 35 that are formed at the cut ends. In order to prevent cracks from occurring in the glass tubes caused by micro leakage or glass distortion in the end walls 34, 35, air is blown into the softened end walls 34, 35 while they are placed against an abutment. In this way, the end walls are processed to be substantially perpendicular to the tube axis direction of the glass tubes 32, 33 and also into flat surfaces. As a result, dislocation portions (edge portions) between the end walls 34, 35 and the glass tubes 32, 33 are processed to be 0.4 to 0.8 times as thick as the average thickness of the glass tubes 32, 33. Furthermore, the central portions of the end walls 34, 35 are processed to be 1 to 1.5 times as thick as the average thickness of the glass tubes 32, 33.

Figure 8:
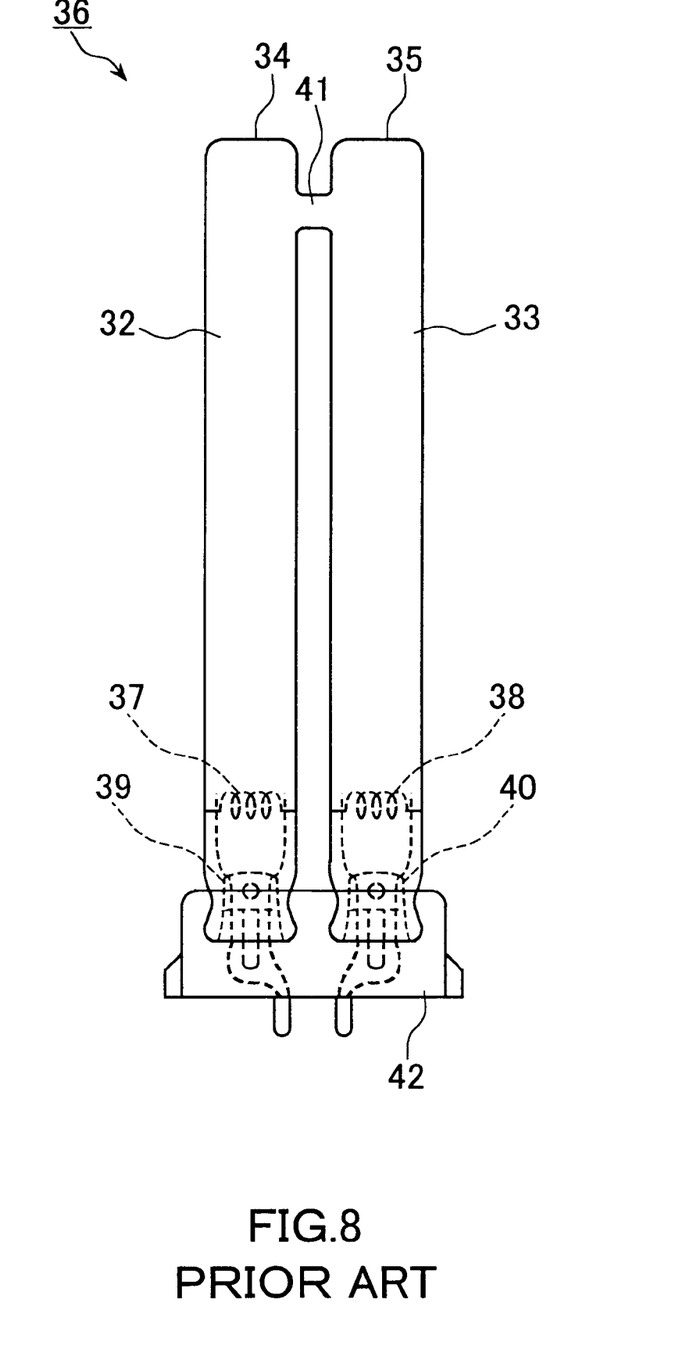
FIG. 8 is a structural drawing of a conventional compact fluorescent lamp.

Next, as illustrated in FIG. 8, when an arc tube 36 for a lamp is manufactured, glass stems 39 and 40 that respectively hold electrode filament coils 37 and 38 are sealed at other end portions of the pair of the glass tubes 32, 33 that are open. The glass tubes 32, 33 are interconnected through a junction bridge 41 in the vicinity of the end portions that are cut and self-closed so as to form a line of discharge path inside the arc tube 36. Rare gas such as mercury and argon is sealed in the arc tube 36. In the completed form, the arc tube 36 of the lamp is equipped with a base 42 that is attached to the end portion on the electrode side.

Figure 9A:
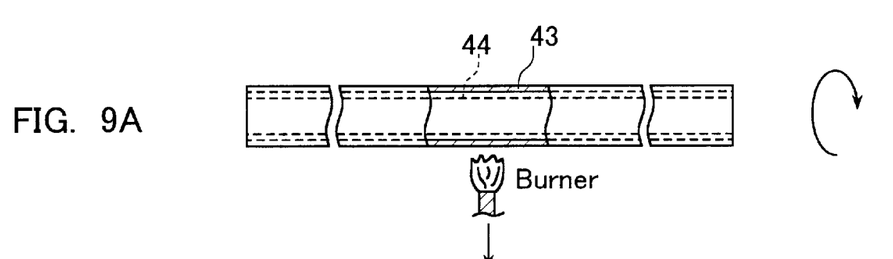
FIG. 9A to FIG. 9C are process drawings showing a conventional method for manufacturing a fluorescent lamp.
Figure 9B:
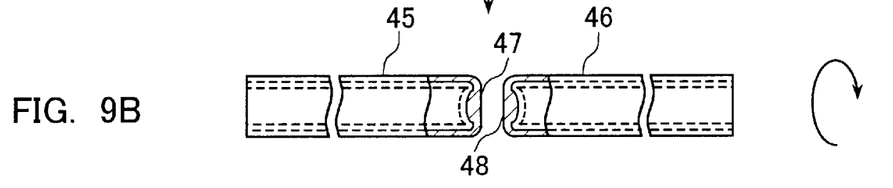
Figure 9C:
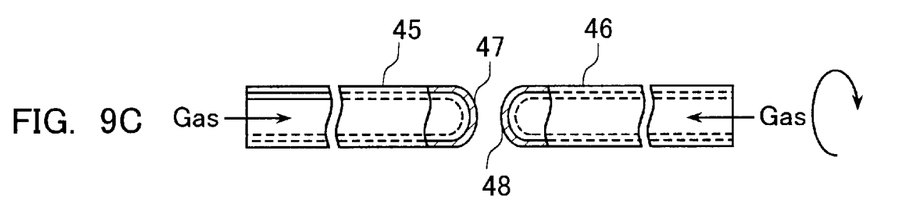

Furthermore, JP11(1999)-40057A proposes another improved method for further suppressing cracks and leakage around the respective end walls 34, 35 of the glass tubes 32, 33 that are cut and self-closed as shown in FIG. 7C. The problem with the case illustrated in FIG. 7C is that the glass residual distortion exists in the glass due to uneven thicknesses of the end walls, and that cracks and leakage occur around the end walls 34, 35 when the arc tube is heated in the following lamp manufacturing process as well as over the lighting life of the lamp, or when shocks or vibrations are inflicted on the lamps during transportation. Therefore, as illustrated in FIG. 9A to FIG. 9C, a glass tube that rotates around a tube axis is heated at the area around the center by a burner, and the glass tube is cut into two pieces that make a pair having end walls that close by itself. Then, while end walls 47 and 48 of self-closing glass tubes 45 and 46 are still soft, a gas (air or nitrogen) is supplied into the glass tubes 45, 46 respectively from the other ends that are open, so that the end walls 47, 48 respectively are inflated to form convex surfaces. In this way, the glass tubes are processed to have the end walls with uniform thicknesses and also without glass residual distortion.

The performance characteristics of the above compact fluorescent lamp interconnected with a junction bridge are that when the lamp is lit up, the coldest points that control the vapor pressure of mercury in the tubes to be within the optimal range are formed in the end walls 34, 35 of the glass tubes 32, 33 that are cut and self-closed as in the example shown in FIG. 7C. Furthermore, the luminous flux of the lamp is maintained around the maximum value.

By using the compact fluorescent lamps manufactured according to the conventional techniques described above in which the glass tube is cut and closed in the glass processing step and then interconnected by a bridge, defective percentage of the lamps during the manufacturing process and also on the market where the lamps actually are consigned was examined and analyzed over a long period of time. As a result, for example, with regard to the compact fluorescent lamps of 36W illustrated in FIG. 8 in which two glass tubes having an outer diameter of 20 mm are joined, the defective percentage of the lamps manufactured according to the method described in JP4(1992)-58137A above was 0.5% in the manufacturing process due to cracks, leakage, or damages around the end walls of the glass tubes that are cut and closed. On the other hand, the defective percentage of the lamps manufactured according to the method described in JP11(1999)-40057A was 0.02%. As far as the defective percentage in the manufacturing process of the lamps is concerned, the latter method for processing the glass is effective in suppressing cracks and leakage.

However, looking at the defective percentage of the lamps on the market, even with the lamps manufactured according to the method of JP11(1999)-40057A, the defective percentage of the lamps due to cracks, leakage, or damages around the end walls of the glass tubes that are cut and closed proved to be still as comparatively high as about 0.1%. The lamp defects mostly were glass damages around the end walls 47, 48 described above, which can be concluded to be the result of mechanical shocks particularly inflicted during the transportation and the attachment of the lamps. Specifically, even though the end walls 47, 48 of the glass tubes 32, 33 that are cut and closed according to the method of JP11(1999)-40057A are improved also in regard to shock resistance compared to those manufactured according to the glass processing step of JP4(1992)-58137A, the glass thicknesses are reduced by about 27% to 43% versus those of the original glass tube walls. This fact basically is considered to deteriorate the mechanical strength of the end walls 47, 48 and to cause the comparatively high defective percentage of the lamps on the market. Therefore, to reduce the defective percentage of such compact fluorescent lamps during the manufacturing process and also on the actual market, it is important to improve the mechanical strength of the end walls 47, 48 of the glass tubes that are cut and self-closed.

SUMMARY OF THE INVENTION

In order to solve the conventional problems described above, it is an object of the present invention to provide a method for manufacturing a fluorescent lamp in which end walls of glass tubes that are cut and self-closed have improved mechanical strength and the defective percentage of lamps is reduced even more during the manufacturing process and on the market than that of the conventional lamps.

To achieve the above objects, the method for manufacturing a fluorescent lamp of the present invention is a method for manufacturing a glass tube used for a fluorescent lamp having an arc tube constructed by joining a plurality of glass tubes. According to this method, a straight glass tube held at both ends is rotated, and a predetermined cutting portion of the glass tube is softened by heating, and then the glass tube is moved in the heated state in the direction toward the predetermined cutting portion to form a glass accumulated portion at the area of the predetermined cutting portion. Next, the glass tube is drawn away in the direction receding from the predetermined cutting portion, and the predetermined cutting portion of the glass tube is cut into two glass tubes having self-closing end walls.

According to this method, the end walls of the glass tubes that are cut and self-closed can be formed thicker and more uniform compared to those obtained by the conventional techniques, and the mechanical strength of the end walls also can be improved. As a result, the defective percentage of the lamps during the manufacturing process and also on the market due to cracks, leakage, or damages in the end walls of the glass tubes can be reduced.

DESCRIPTION OF THE PREFERRED EMBODIMENTS

In the method of the present invention, it is preferable that as the predetermined cutting portion of the glass tube is cut by drawing the glass tube away from the predetermined cutting portion, a gas is supplied from both open ends of the glass tubes so as to form the cut portions into convex surfaces. Accordingly, the end walls of the glass tubes that are cut and self-closed can be formed thicker and more uniform compared to those obtained by the conventional techniques, and the mechanical strength of the end walls also can be improved. As a result, the defective percentage of the lamps during the manufacturing process and also on the market due to cracks, leakage, or damages in the end walls of the glass tubes can be reduced. It is preferable that the pressure of the gas to be supplied from the both open ends of the glass tubes is in the range between $7 \times 10^{-3}$ and $3.5 \times 10^{-2}$ MPa.

In the method of the present invention, it is preferable that the straight glass tube is held by chucks respectively at both ends. Thus, the glass processing step of cutting and closing the glass tube can be performed with high precision.

In the method of the present invention, it is preferable that the rotation of the straight glass tube is driven by rotating one of the holding parts. In this case, the other holding part follows the rotation.

In the method of the present invention, it is preferable that the straight glass tube is coated with a fluorescent substance on the inner surface.

In the method of the present invention, it is preferable that, after the predetermined cutting portion of the glass tube is softened by heating, each end of the glass tube is moved in the heated state in the direction toward the predetermined cutting portion by a distance between 1 and 4 mm, and more preferably about 1.5 to 3.5 mm, and particularly between 2 and 3 mm. If it is within this range, the glass accumulated portion can be formed appropriately.

In the method of the present invention, it is preferable that the maximum thickness of the glass accumulated portion in the predetermined cutting portion is 1.2 to 1.5 times as thick as the average thickness of the straight glass tube. If it is within this range, the cut end not only has a uniform thickness but also a thickness that does not differ much from the thickness of the tube wall.

In the method of the present invention, it is preferable that, after the glass tube is cut into two pieces, the glass tube is slowly cooled while a gas is supplied from both open ends of the glass tubes. Thus, the glass distortion can be removed efficiently. In this cooling process, a mold suitable for forming cut ends into a predetermined shape may be placed against the cut ends.

In the method of the present invention, the thickness of the cut end preferably is at least 80% of the thickness of the straight glass tube so that damages can be prevented.

In the method of the present invention, the cut end preferably has such mechanical strength that the cut end is not damaged even if the steel ball drop test is repeated five times, by which a steel ball of 10 mm in diameter and 4.2 g in weight is dropped from above at a height of 100 mm in the vertical direction on the cut end facing upward.

EXAMPLE 1

Hereinafter, a method for manufacturing a fluorescent lamp according to one embodiment of the present invention will be explained with reference to FIGS. 1A to 1F.

Figure 1A:
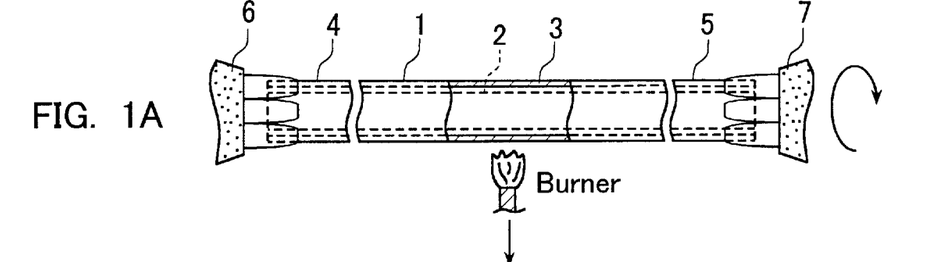
FIG. 1A to FIG. 1F are process drawings showing a method for manufacturing a fluorescent lamp according to one embodiment of the present invention.

(1) A straight glass tube 1, for example, with a wall thickness of 0.85 mm and an outer diameter of 16.5 mm that is coated with a fluorescent substance 2 on the inner surface is rotated around a tube axis, and while the glass tube is rotated, a predetermined cutting portion 3 of the glass tube 1 is heated, e.g. by a burner (FIG. 1A). Here, end portions 4 and 5 of the glass tube 1 respectively are held by a pair of coaxial chucks 6 and 7, and thus the glass is processed with high precision also throughout the following steps.

Figure 1B:
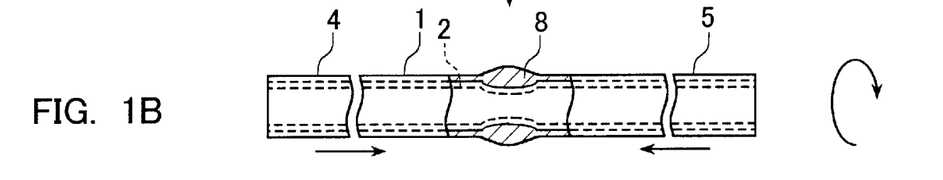

(2) When the predetermined cutting portion 3 of the glass tube is softened by heating, while the glass tube is heated continuously by a burner, the end portions of the glass tube 1 respectively are moved for 2.5 mm in the direction toward the predetermined cutting portion 3 at a speed of 1.66 mm/sec (by giving compressive force in the internal direction) so that a glass accumulated portion 8 is formed by the glass pushed together (FIG. 1B).

Figure 1C:
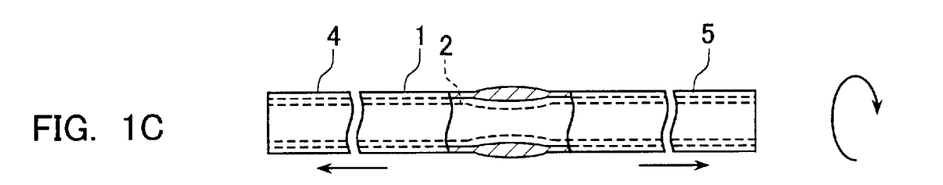

(3) Then, the end portions of the glass tube 1 respectively are drawn for 3 mm at a speed of 4 mm/sec in the direction opposite to the predetermined cutting portion 3 so as to stretch the glass accumulated portion 8 by the heat of the burner (FIG. 1C).

Figure 1D:
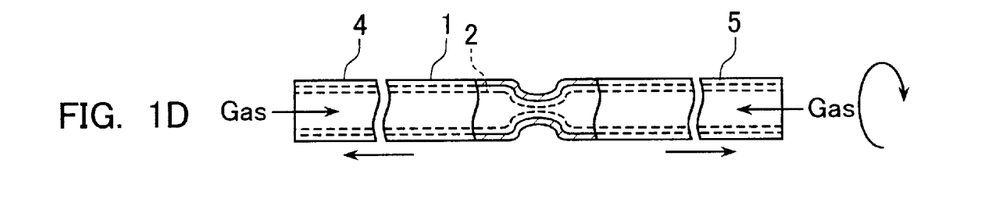

(4) When the glass accumulated portion 8 of the glass tube 1 is stretched to be narrower in diameter, a gas (air, nitrogen etc.) is supplied with the pressure of $1.5 \times 10^{-2}$ MPa from the end portions 4, 5 of the glass tube 1 toward the middle (FIG. 1D).

Figure 1E:
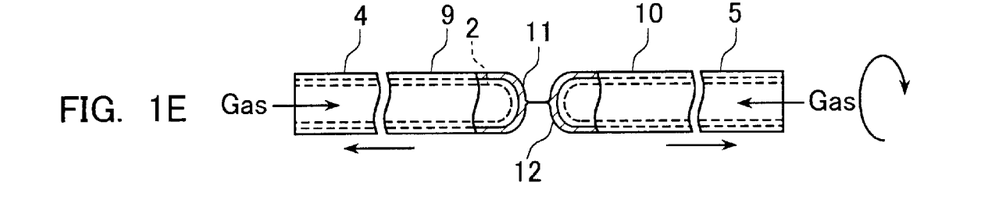

(5) The glass tube is stretched further so as to make the stretched portion even more narrow (FIG. 1E).

Figure 1F:
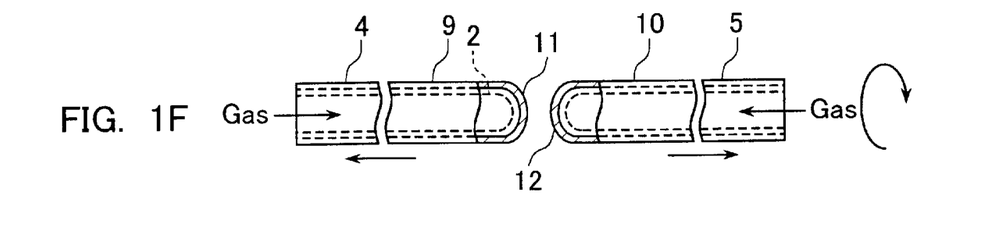

(6) The glass tube 1 is cut into two glass tubes 9 and 10 by the heat of the burner. In this case, end walls 11 and 12 of the cut glass tubes 9, 10 are softened so that the end walls close by itself. In the meantime, the gas is supplied continuously into the glass tube so as to form the end walls 11, 12 into convex surfaces. After the glass tubes 9, 10 are cut, the areas around the respective end walls 11, 12 are cooled slowly by adjusting the heating temperature of the burner, and the glass distortion is removed. During this process, the gas is supplied continuously so as to finish forming the end walls 11, 12 (FIG. 1F). At this stage, to form the end walls 11, 12 with high precision, a mold suitable for forming a molding shape may be placed against the end walls 11, 12.

According to the present invention, the glass accumulated portion 8 is formed previously by pushing the glass together in the predetermined cutting portion 3 of the glass tube 1, and as described above in the steps (4) to (6), the gas is supplied from the other open ends of the glass tubes that are cut and self-closed. After the glass tube is cut, the self-closing end walls 11, 12 are formed into convex surfaces. Furthermore, it is also necessary for processing the glass with high precision that the both end portions of the glass tube to be cut are held by chucks.

Due to the above steps, as will be shown later in detailed experimental data, the end walls of the glass tubes that were cut and self-closed according to the glass manufacturing process of the present invention are formed to be thicker and also to have more uniform thicknesses than those manufactured by the conventional techniques, and the mechanical strength of the end walls has increased. As a result, when it is compared with the products manufactured by the conventional techniques, the defective percentage of the lamps due to cracks, leakage, or damages around the end walls 11, 12 of the glass tubes 9, 10 that are cut and self-closed can be reduced even more not only in the manufacturing process of the lamps but also on the market.

Figure 2:
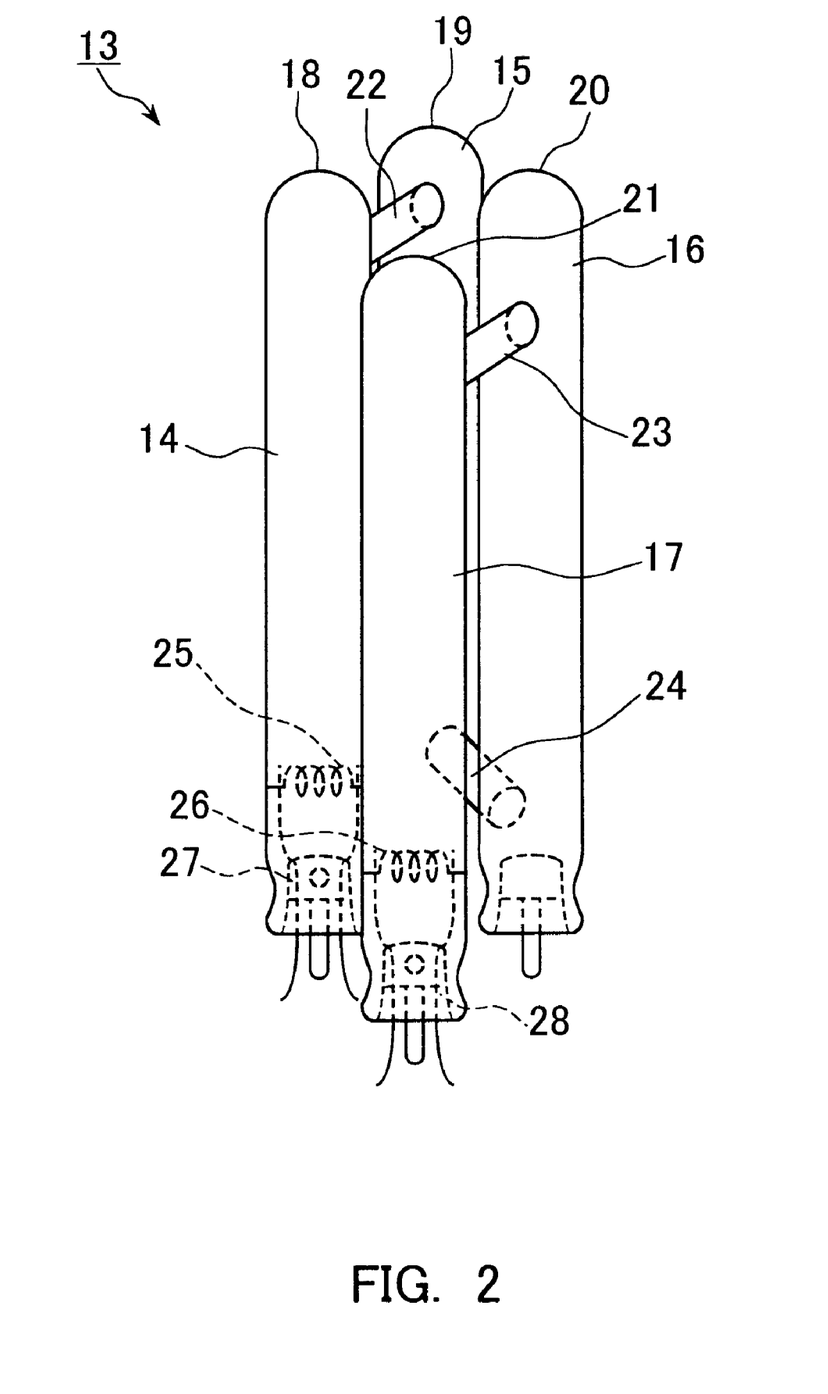
FIG. 2 is a perspective view showing an arc tube of the compact fluorescent lamp.
Figure 3:
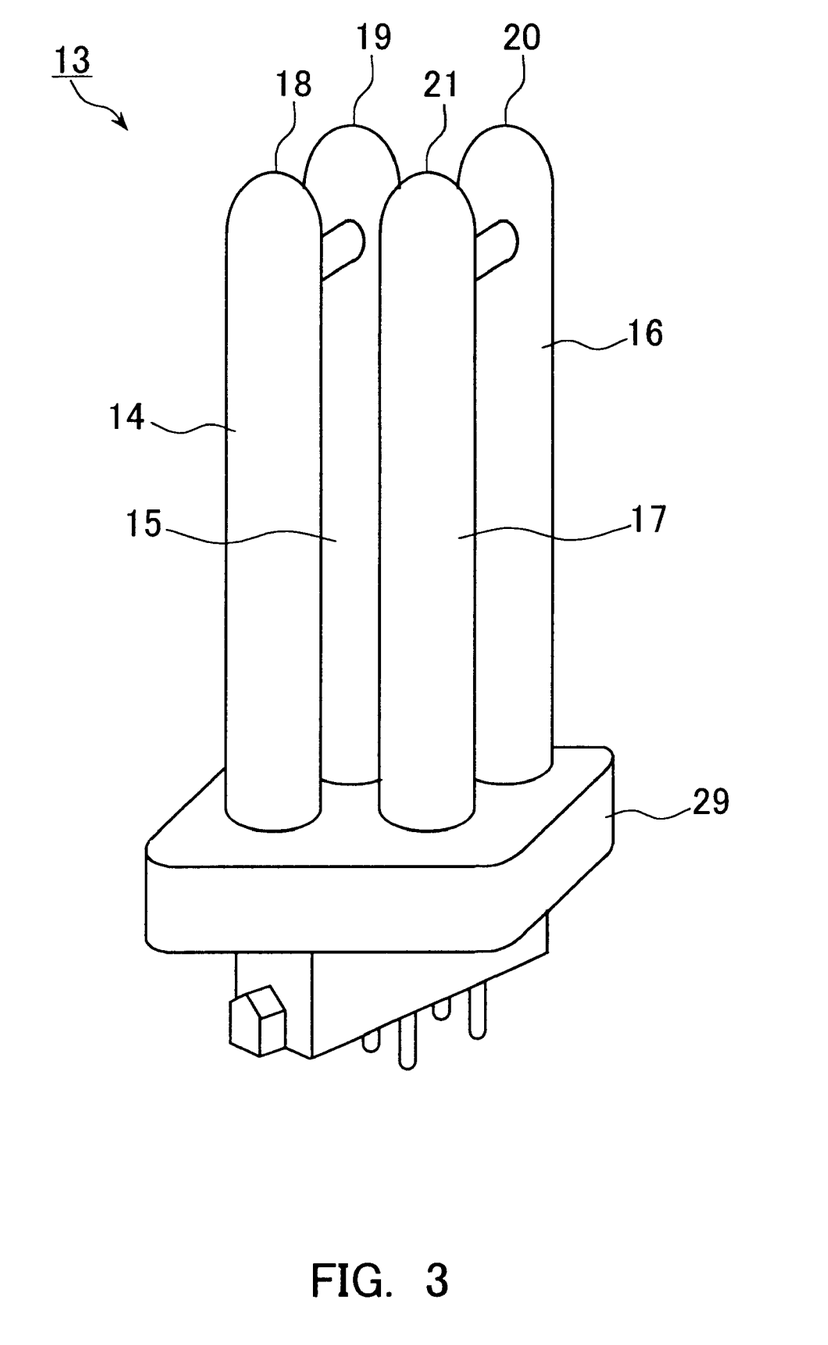
FIG. 3 is a perspective view showing the compact fluorescent lamp.

FIG. 2 and FIG. 3 respectively illustrate the structure of an arc tube for a compact fluorescent lamp according to the present invention in which glass tubes manufactured by the method shown in FIGS. 1A to 1F are used. An arc tube 13 in FIG. 2 is constructed of 4 pieces of glass tubes 14, 15, 16, and 17 that are coated with the fluorescent substance 2 on the inner surfaces, and these four glass tubes are interconnected at three junction bridges 22, 23, and 24 so as to form a line of discharge path. In this configuration, the glass tubes 14 to 17 respectively are closed by end walls 18 to 21. Furthermore, glass stems 27, 28 supporting electrode filament coils 25, 26 respectively are sealed to other end portions of the glass tubes 14 to 17 that are open. Inside the arc tube 13, rare gas mainly composed of mercury and argon is sealed at $3.99 \times 10^2$ Pa (3 Torr), and the electrode filament coils 25, 26 are filled with an emissive material. In the completed form, as shown in FIG. 3, the lamp is equipped with a base 29 that is attached to the arc tube 13.

Figure 4:
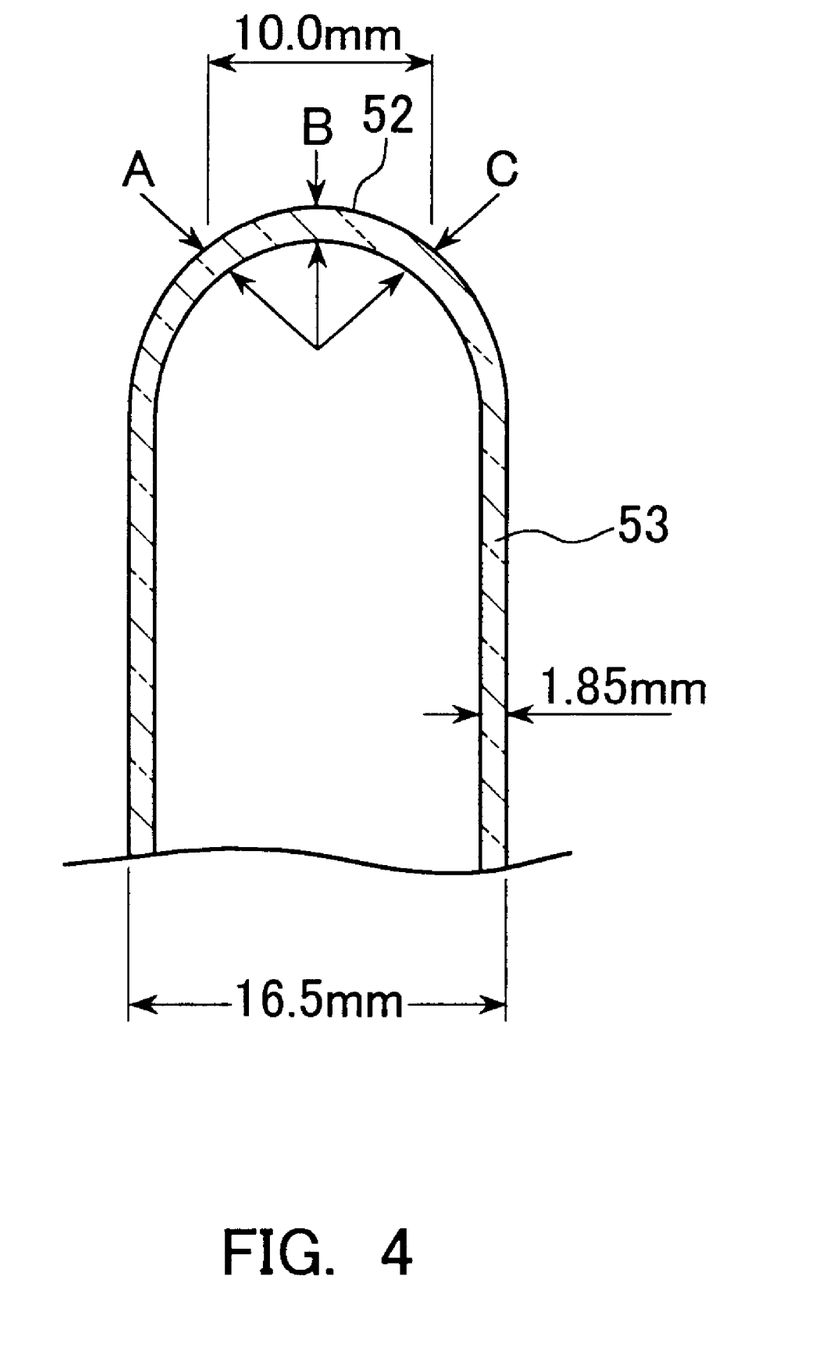
FIG. 4 is an enlarged sectional view showing an end wall of a glass tube in one embodiment of the present invention.
Figure 6:
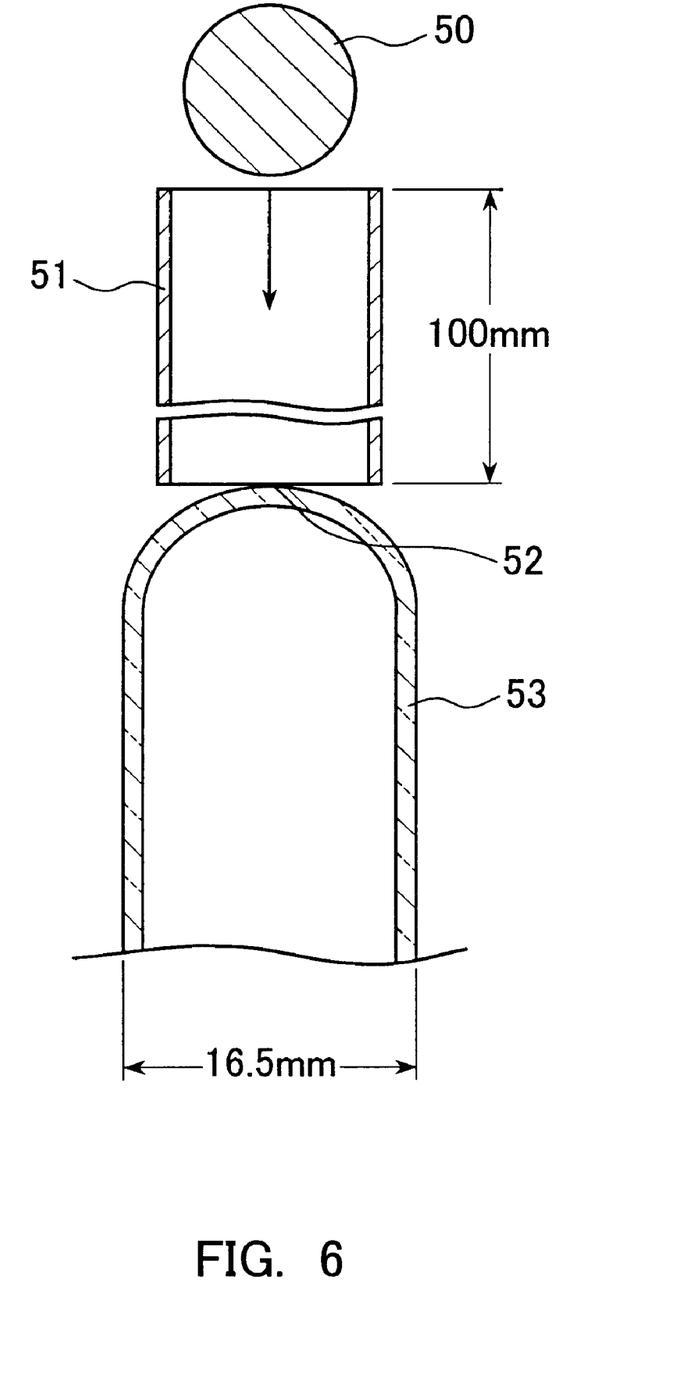
FIG. 6 is a drawing showing a measuring method according to the steel ball drop test (mechanical strength).

Next, by using the compact fluorescent lamp of 27W of the present invention that is constructed according to the embodiment illustrated in FIG. 3 (hereinafter referred to as Example 1), the thickness and the mechanical strength of the cut and closed end walls 18 to 21 of the glass tubes 14 to 17 respectively were measured. In this case, as shown in FIG. 4, the thicknesses of the end walls 18, 19, 20, and 21 were measured at three spots indicated as A, B (central portion), and C. On the other hand, as illustrated in FIG. 6, the mechanical strength of each end wall was judged by whether or not the glass is damaged when a steel ball of 10 mm in diameter and 4.2 g in weight was dropped five times from above at a height of 100 mm toward the central portion of the end walls 18 to 21. The size of the glass tubes 14 to 17 used for this measurement was 16.5 mm in outer diameter and 0.85 mm thick in the side wall. The measurement was conducted for a total of 12 lamps (3 pieces of the lamp with the glass tubes 14 to 17 described above). In addition, for the purpose of comparison, the same measurement was conducted by using the same kind of compact fluorescent lamps of 27W manufactured by the methods based on JP4(1992)-58137A (See FIG. 7, referred to as Comparative Example I) and JP11(1999)-40057A (See FIG. 10, referred to as Comparative Example II). As a result, the following facts have been confirmed.

Figure 5:
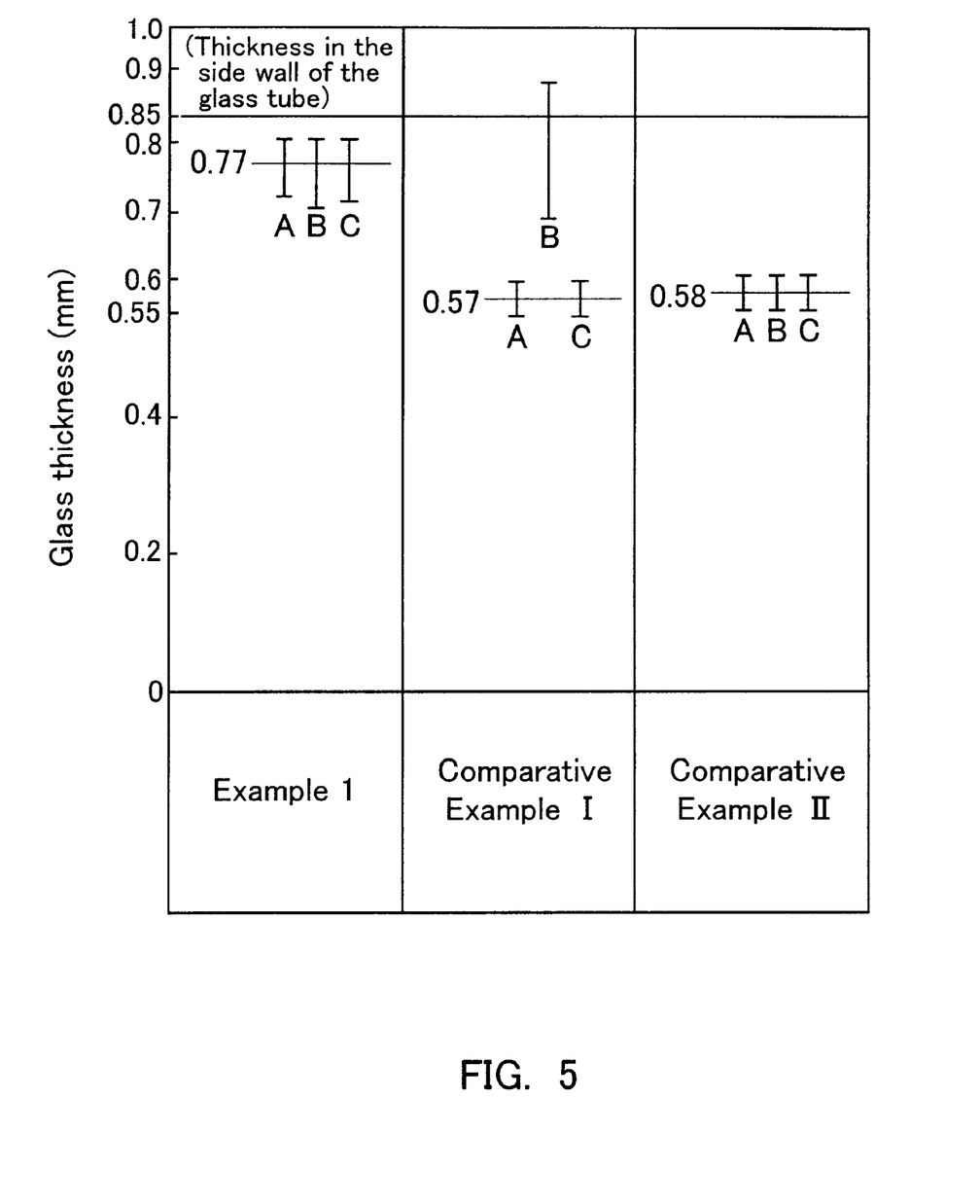
FIG. 5 is a drawing showing the results of measuring the thicknesses of glass tubes in self-closed end walls of Example 1 and of Comparative Examples I and II.

As shown in FIG. 5, the end walls 18 to 21 of the glass tubes 14 to 17 in Example 1 had thicknesses that are distributed in the range between 0.7 mm and 0.8 mm, and on average 0.77 mm. In other words, the thickness values of the end walls 18 to 21 all fall in the range of at least 80% of the thickness 0.85 mm in the side wall of the glass tube. The end walls 18 to 21 also had uniform thicknesses.

On the other hand, as shown in FIG. 5, the self-closed end walls of the glass tubes in Comparative Example I had thicknesses that are distributed in the range between 0.55 mm and 0.60 mm at the spots A and C, and on average 0.57 mm. These thickness values all fall less than 80% of the thickness 0.85 mm in the side wall of the glass tube, and specifically 67%. Furthermore, the thickness of the end wall at the spot B (the central portion) was larger than the thicknesses at the spots A and C with the result of 0.7 mm to 0.9 mm. This was due to the presence of a so-called glass accumulated portion that caused the end wall to have an uneven thickness.

Furthermore, as shown in FIG. 5, the self-closed end walls of the glass tubes in Comparative Example II had thicknesses that are distributed in the range between 0.55 mm and 0.60 mm, and on average 0.58 mm. These thickness values all fall less than 80% of the thickness 0.85 mm in the side wall of the glass tube, and specifically 68%.

Next, the steel ball drop test will be explained. As illustrated in FIG. 6, a cut end 52 of a glass tube 53 faces upward, and a steel ball 50 of 10 mm in diameter and 4.2 g in weight is dropped from above at a height of 100 mm in the vertical direction through a cylinder 51. This steel ball drop test is repeated five times, and the test is stopped at the moment when the glass tube is damaged.

The mechanical strength of the self-closed end walls 18 to 21 of the glass tubes 14 to 17 in Example 1 was measured by the above steel ball drop test. The results are shown in Table 1 below.

TABLE 1

| Test Sample | Example 1 (Number of Test) | | | | | Comparative Example I (Number of Test) | | | | | Comparative Example II (Number of Test) | | | | |
|---|---|---|---|---|---|---|---|---|---|---|---|---|---|---|---|
| No. | 1 | 2 | 3 | 4 | 5 | 1 | 2 | 3 | 4 | 5 | 1 | 2 | 3 | 4 | 5 |
| 1 | O | O | O | O | O | X | — | — | — | — | X | — | — | — | — |
| 2 | O | O | O | O | O | X | — | — | — | — | X | — | — | — | — |
| 3 | O | O | O | O | O | X | — | — | — | — | X | — | — | — | — |
| 4 | O | O | O | O | O | X | — | — | — | — | X | — | — | — | — |
| 5 | O | O | O | O | O | O | X | — | — | — | O | O | O | O | O |
| 6 | O | O | O | O | O | O | X | — | — | — | O | X | — | — | — |
| 7 | O | O | O | O | O | O | O | O | X | — | O | O | O | O | O |
| 8 | O | O | O | O | O | X | — | — | — | — | O | O | O | X | — |
| 9 | O | O | O | O | O | X | — | — | — | — | O | O | O | O | O |
| 10 | O | O | O | O | O | X | — | — | — | — | O | O | O | O | O |
| 11 | O | O | O | O | O | O | O | O | O | O | X | — | — | — | — |
| 12 | O | O | O | O | O | O | X | — | — | — | O | O | O | O | O |

[Remarks]
O: glass in the end wall was not damaged
X: glass in the end wall was damaged As shown in Table 1, the end walls 18 to 21 were not damaged. However, as for Comparative Examples I and II, the end walls of the glass were damaged in the same tests with the following results:

(i) 11 out of 12 test lamps in Comparative Example I, and
(ii) 7 out of 12 test lamps in Comparative Example II.

As is clear from the above results, the method for manufacturing a fluorescent lamp of the present invention can provide glass tubes having self-closed end walls that have considerably improved mechanical strength than those obtained by the conventional glass processing steps. At the same time, it was confirmed that the thicknesses of the end walls can be more uniform.

Next, by using the same compact fluorescent lamp of 27W that is constructed as in FIG. 3 that is provided with the glass tubes obtained by the manufacturing method of the present invention, the defective percentage of the lamps was examined under the working conditions corresponding to those during the lamp manufacturing process and on the actual market (truck transportation in the packed state, attachment to a lighting fixture and lightning lifetime). The following results were obtained.

During the manufacturing process of the compact fluorescent lamp of 27W according to the present invention, it was clear that the defective percentage of the lamps due to cracks, leakage, or damages in the end walls of the cut and self-closed glass tubes was reduced to the level of 0.01%, compared to the defective percentage of the lamps manufactured by the conventional techniques respectively illustrated in FIG. 7 and FIG. 9 having the results of 0.5% and 0.03%.

Furthermore, by using the compact fluorescent lamps obtained by the present invention under the working conditions corresponding to those on the market, it was clear that the defective percentage of the lamps due to cracks, leakage, or damages in the end walls of the cut and self-closed glass tubes also is reduced to the level of 0.01%, compared to the defective percentage of the lamps manufactured by the conventional techniques respectively illustrated in FIG. 7 and FIG. 9 having the results of 0.2% and 0.1%.

According to the method for manufacturing a fluorescent lamp of the present invention described above, the end walls of the glass tubes that are cut and self-closed can be formed thicker and more uniform compared to those obtained by the conventional techniques, and the mechanical strength of the end walls also can be improved. As a result, the defective percentage of the lamps due to cracks, leakage, or damages in the end walls of the glass tubes can be reduced even more.

The present invention is not limited to the compact fluorescent lamps illustrated in FIG. 2 and FIG. 3 in which four pieces of the glass tubes 14 to 17 described above are joined by junction bridges. The present method can be applied to the manufacture of lamps constructed by joining, for example, two, six, or eight pieces of glass tubes. This method also is applicable to the manufacture of three or more pieces of cut and closed glass tubes using one glass tube, or applicable to the manufacture of one glass tube by cutting and closing one end of a glass tube.

As explained above, in the method for manufacturing a fluorescent lamp according to the present invention, the end walls of the self-closed glass tubes can be formed thicker and more uniform compared to those obtained by the conventional techniques, and the mechanical strength of the end walls also can be improved. As a result, the defective percentage of the lamps during the manufacturing process and on the market due to cracks, leakage, or damages in the end walls of the glass tubes can be reduced even more.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for manufacturing a fluorescent lamp having an arc tube constructed by joining a plurality of glass tubes, comprising:

rotating a straight glass tube held at both ends, softening a predetermined cutting portion of the glass tube by heating, moving the glass tube in the heated state in the direction toward the predetermined cutting portion to form a glass accumulated portion at the area of the predetermined cutting portion, drawing the glass tube away in the direction receding from the predetermined cutting portion, and cutting the predetermined cutting portion of the glass tube into two glass tubes having self-closing end walls.

2. The method for manufacturing a fluorescent lamp according to claim 1, wherein, as the glass tube is drawn away in the direction receding from the predetermined cutting portion to cut the predetermined cutting portion, a gas is supplied from both open ends of the glass tubes so as to form the cut portions into convex surfaces.

3. The method for manufacturing a fluorescent lamp according to claim 2, wherein the pressure of the gas to be supplied from the both open ends of the glass tubes is in the range between $7 \times 10^{-3}$ and $3.5 \times 10^{-2}$ MPa.

4. The method for manufacturing a fluorescent lamp according to claim 1, wherein the straight glass tube is held by chucks respectively at both ends.

5. The method for manufacturing a fluorescent lamp according to claim 1, wherein the rotation of the straight glass tube is driven by rotating one of the holding parts.

6. The method for manufacturing a fluorescent lamp according to claim 1, wherein the straight glass tube is coated with a fluorescent substance on the inner surface.

7. The method for manufacturing a fluorescent lamp according to claim 1, wherein, after the predetermined cutting portion of the glass tube is softened by heating, each end of the glass tube is moved in the heated state in the direction toward the predetermined cutting portion at a distance between 1 and 4 mm.

8. The method for manufacturing a fluorescent lamp according to claim 1, wherein a maximum thickness of the glass accumulated portion in the predetermined cutting portion is 1.2 to 1.5 times as thick as the average thickness of the straight glass tube.

9. The method for manufacturing a fluorescent lamp according to claim 1, wherein, after the glass tube is cut into two pieces, the glass tube is slowly cooled while a gas is supplied from both open ends of the glass tubes.

10. The method for manufacturing a fluorescent lamp according to claim 9, wherein in the cooling process a mold suitable for forming cut ends into a predetermined shape is placed against the cut ends.

11. The method for manufacturing a fluorescent lamp according to claim 1, wherein the thickness of the cut end is at least 80% of the thickness of the straight glass tube.

12. The method for manufacturing a fluorescent lamp according to claim 1, wherein the cut end has such mechanical strength that the cut end is not damaged even if a steel ball drop test is repeated five times, by which a steel ball of 10 mm in diameter and 4.2 g in weight is dropped from above at a height of 100 mm in the vertical direction on the cut end facing upward.

* * * * *